Sept. 17, 1935. J. MAYER 2,014,811
VEHICLE WHEEL
Filed June 7, 1934
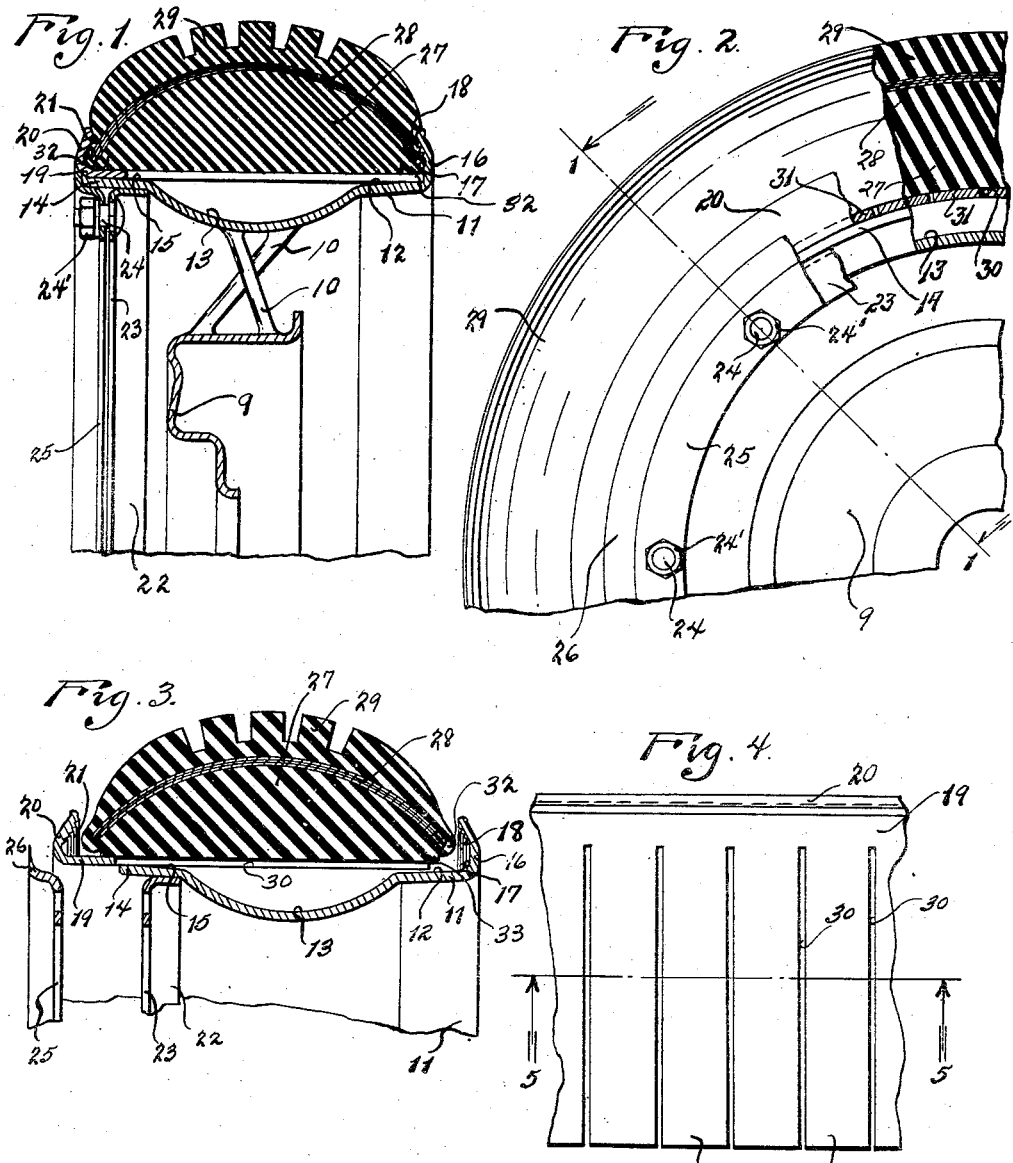
INVENTOR.
JULIUS MAYER.
BY
ATTORNEY.

Patented Sept. 17, 1935

2,014,811

UNITED STATES PATENT OFFICE 2,014,811

VEHICLE WHEEL

Julius Mayer, Detroit, Mich.

Application June 7, 1934, Serial No. 729,423

5 Claims. (Cl. 152—7)

My invention relates to a new and useful improvement in a vehicle wheel and particularly the construction thereof relating to the tire and the means for securing the same in position.

It is an object of the present invention to provide a vehicle wheel so constructed that a solid tire may be used and substantially the same resiliency and smoothness and ease in riding accomplished as is now attained by the use of the pneumatic tire.

Another object of the invention is the provision of a construction in which a pneumatic tire is held in position on the vehicle wheel in such a way that the same may flex against the resiliency of resilient metal positioned beneath the tire.

Another object of the invention is the provision of means for securing the tire in position so that as the tire wears or is subjected to a radial inward thrust, the securing means will more tightly grip the tire.

Another object of the invention is the provision in a vehicle wheel of a tire so arranged and constructed as to possess the maximum wear-resisting qualities and render itself to an easy and quick method of attachment to a vehicle wheel.

Another object of the invention is the provision of a tire mounting so arranged and constructed as to be economical of manufacture, durable and highly efficient in use, and one which permits easy and quick assembly and disassembly of the tread portions.

Other objects will appear hereinafter.

The invention consists in the combination and arrangement of parts hereinafter described and claimed.

The invention will be best understood from a reference to the accompanying drawing which forms a part of this specification and in which, Fig. 1 is a fragmentary transverse sectional view of a vehicle wheel embodying the invention taken on substantially line 1—1 of Fig. 2.

Fig. 2 is a fragmentary side elevational view of a vehicle wheel embodying the invention with parts broken away.

Fig. 3 is a view similar to Fig. 2 with the securing means partly moved into non-securing position.

Fig. 4 is a fragmentary plan view of a supporting member used in the invention.

Fig. 5 is a sectional view taken on line 5—5 of Fig. 4.

In the drawing I have shown a vehicle wheel consisting of a disc body 9 having spokes 10 connecting to a rim, the marginal edge 11 of which is provided with the inwardly inclined surface 12 to the belly of the concave portion 13. The opposite edge 14 of this rim is also provided on its periphery with the inclined surface 15. Extending upwardly from the edge 11 is the flange 16 which is formed with a channel 17 on its inner surface, and provided adjacent its upper side on the inner surface, with teeth or circumferential corrugations 18. A clamping ring 19 is used on the opposite side to the flange 16 and this ring 19 is provided with a flange 20 which is bent inwardly and provided on its inner surface or circumferentially extending corrugations 21. Secured to the rim of the wheel by welding or any other suitable manner is an attachment ring 22 having the inwardly projecting flange 23 formed thereon, through which may be projected the bolts 24 which also project through the binding ring 25 having the flange 26 adapted to engage the outer faces of the ring 19.

The tire is formed from solid rubber, and the main body 27 is reinforced by the transversely extending cords 28, so that the tire is a solid cord tire. Positioned on the outer surface of the tire is the tread portion 29.

The ring 19 is of substantially the same width as the wheel and as clearly shown in Fig. 4, this ring is slitted as at 30 at spaced intervals to provide the tongues 31 which are free at one of their ends, and each of the tongues is free from the other throughout its length.

The tire is provided at its opposite edges with the substantially cylindrical bead 32 which is the binding bead commonly used for binding the various parts of the tire together and for a type of construction well-known in the tire-making art.

In mounting the tire in position on the wheel the tire is forced into position on the ring or annulus 19. It will be noted from Fig. 3 that there is a portion 33 of the tire which projects inwardly of the beads 32. This body which is located inwardly of the layer of cords 28 is formed of comparatively soft or flexible rubber, and the portion 33 may be termed an outwardly projecting base on the tire body. This portion 33 rests on the tongues 31 and one of the beads is engaged on the unslitted portion of the ring 19, and against the inner surface of the flange 20. When in this position the annulus or ring 19 with the tire mounted thereon is slid into position as shown in Fig. 3, so that the annulus rests at its opposite ends on the portions 11 and 14 of the wheel rim. By means of the bolts 24 and nuts 24' threaded thereon the tire, together with the ring 26 may be forced into the position shown in Fig. 1, so that the beads 32 are securely clamped between the flanges 16 and 20. When radially inward pressure is directed on the tire, the tire will yield in its own body and also the supporting annulus or ring 19 will flex and it will be noted as shown in Fig. 1 that on account of having the surfaces 12 and 15 inclined, the flexing of the tongues 31 is facilitated. Furthermore, the flexing is uninterfered with in the central portion of the tire because of the presence of the concavity 13. This concavity also provides an air cushion for yieldably resisting the inward pressure. The tire of course is clamped between the flanges 16 and 20 and any inward pressure will but serve to force the tire inwardly beneath the flanges 16 and 20 which incline toward each other so as to more securely lock the tire in position. The corrugations 17 and 21 are faced to resist outward movement of the tire relatively to the flanges, but to permit easy inward movement of the tire. With a wheel constructed in this manner it is believed apparent that the advantages of it will be obtained, and that an economical structure is provided.

While I have illustrated and described the preferred form of construction I do not wish to limit myself to the precise details of structure shown but desire to avail myself of such variations and modification as come within the scope of the appended claims.

Having thus described my invention what I claim as new and desire to secure by Letters Patent is:

1. In combination a vehicle wheel having an annular rim provided at one edge with an outwardly projecting flange inclined inwardly of the rim; a supporting annulus positioned on said rim and having at one edge an outwardly projecting flange inclined inwardly toward the flange on said rim, the body of said supporting annulus being slitted axially to provide a plurality of spaced tongues; a tire on said supporting annulus and engaging at its inner edges between said flanges; and means for moving said supporting annulus toward the flange of said rim and clamping said tire between said flanges; and means on each of said flanges for resisting outward movement of the tire relatively thereto, the rim of said wheel being formed concave adjacent to its center and having its outer edges provided with an inwardly inclined surface, said supporting annulus resting on said inclined surface.

2. In combination a vehicle wheel having a rim formed concave on its peripheral surface adjacent its center and extending outwardly therefrom at opposite sides to provide surfaces inclining outwardly therefrom; an outwardly projecting flange on one edge of said rim; a supporting annulus slitted at spaced intervals to provide spaced tongues, said supporting annulus being formed from a resilient metal; an outwardly projecting flange on one edge of said supporting annulus, said flanges being inclined inwardly toward each other; gripping means on the inner surfaces of each of said flanges and engaging and resisting outward movement of a tire clamped therebetween; a tire positioned on said annulus and engaging at its inner edges between said flanges; and means for moving said flanges into approach and clamping the tire therebetween.

3. In combination a vehicle wheel having an annular rim, the major portion of said rim being dished inwardly to provide a concave structure and the edge portions of said rim having flat peripheral surfaces inclined inwardly toward the center of the rim; a tire supporting annulus of substantially the same width as said rim and engaging at its opposite edges on the flat faced portions of said rim, said annulus being provided with a plurality of spaced axial slits extending inwardly from one edge and terminating adjacent the opposite edge; and a tire supported on said annulus.

4. In combination a vehicle wheel having an annular rim, the major portion of said rim being dished inwardly to provide a concave structure and the edge portions of said rim having flat peripheral surfaces inclined inwardly toward the center of the rim; a tire supporting annulus of substantially the same width as said rim and engaging at its opposite edges on the flat faced portions of said rim, said annulus being provided with a plurality of spaced axial slits extending inwardly from one edge and terminating adjacent the opposite edge; an outwardly projecting inwardly inclined flange on one edge of said rim, the slitted edge of said annulus projecting toward the inner surface of said flange; an outwardly projecting inwardly inclined flange on the edge of said annulus opposite to said slits; a tire positioned on said annulus; and means for moving said flanges into clamping relation to the edges of said tire.

5. In a combination a vehicle wheel having an annular rim, the major portion of said rim being dished inwardly to provide a concave structure and the edge portions of said rim having flat peripheral surfaces inclined toward the center of the rim; a tire supporting annulus of substantially the same width as said rim and engaging at its opposite edges on the flat faced portions of said rim, said annulus being provided with a plurality of spaced axial slits extending inwardly from one edge and terminating adjacent the opposite edge; an outwardly projecting inwardly inclined flange on one edge of said rim, the slitted edge of said annulus projecting toward the inner surface on the edge of said annulus opposite to said slits; a tire positioned on said annulus; means for moving said flanges into clamping relation to the edges of said tire; and gripping means on the inner surface of each of said flanges for resisting outward movement of the tire.

JULIUS MAYER.